United States Patent
Nagata et al.

[11] Patent Number: 5,335,127
[45] Date of Patent: Aug. 2, 1994

[54] LAMINATION TYPE MAGNETO-RESISTIVE HEAD

[75] Inventors: Yuji Nagata, Yao; Toshio Fukazawa, Kyoto; Satoru Mitani, Hirakata, all of Japan

[73] Assignee: Matsushita Electric Industrial Co., Ltd., Kadoma, Japan

[21] Appl. No.: 902,580

[22] Filed: Jun. 22, 1992

[51] Int. Cl.⁵ ............................................. G11B 5/127
[52] U.S. Cl. .................................................. 360/113
[58] Field of Search ........................................ 360/113

[56] References Cited

U.S. PATENT DOCUMENTS

| | | | |
|---|---|---|---|
| 4,195,323 | 3/1980 | Lee | 360/113 |
| 4,616,281 | 10/1986 | Nakamura | 360/113 |
| 4,673,998 | 6/1987 | Souda et al. | 360/113 |
| 5,115,364 | 5/1992 | Somers | 360/113 |
| 5,212,611 | 5/1993 | Dee | 360/113 |

Primary Examiner—Richard E. Gluck
Attorney, Agent, or Firm—Wenderoth, Lind & Ponack

[57] ABSTRACT

A lamination type magneto-resistive head used for a magnetic reproducing apparatus is formed by laminating two magneto-resistive heads, at least with the position of two magneto-resistive elements substantially shifted from each other for lamination and also enabling a plurality of track formats to be conformed, thus making it possible to assure stable outputs at a low frequency range.

2 Claims, 6 Drawing Sheets

LAMINATION TYPE MAGNETO-RESISTIVE HEAD

BACKGROUND OF THE INVENTION

1. Field of the Invention

The present invention relates to a lamination type magneto-resistive head used for a magnetic recording-/reproducing apparatus.

Recently, a magneto-resistive head has come to attract the attention in compliance with the trend to a higher recording density, higher data transfer speed and multi-channel recording in the magnetic recording/reproducing apparatus. Especially, with the magnetic recording/reproducing apparatus in which a magnetic recording medium runs at a low speed, magneto-resistive heads are being used so that the reproduced outputs are independent of the speed.

2. Description of the Prior Art

FIG. 6(a) and 6(b) show a conventional magneto-resistive head. FIG. 6(a) is a perspective view of the main area and FIG. 6(b) is a sectional drawing shown at a section I—I' of FIG. 6(a). The conventional magneto-resistive head is formed with a first magnetic layer 27 composed of Permalloy, Sendust or amorphous magnetic materials, etc. on a substrate 21 which is comprised of glass or ceramics, a bias conductor 22 composed of a conductive material such as gold thin film or copper thin film which is a means of applying a bias magnetic field to a magneto-resistive element 23, a magneto-resistive element 23 comprised of Permalloy thin film, electrodes 24a and 24b formed of the gold thin film or copper thin film for providing a driving current to the magneto-resistive element 23, a second magnetic layer 25 and a third magnetic layer 26 composed of soft magnetic material through an insulating layer 32 such as SiO$_2$ or the like together with a first gap 28 and a second gap 29 consecutively. Furthermore, a protection layer 31 is formed and finally a cover plate 3 is bonded, thereby completing the magneto-resistive head. In the vicinity of the second gap 29, between the second magnetic layer 25 and the third magnetic layer 26, said magneto-resistive element 23 is formed in such a manner that said magneto-resistive element 23 over-laps each edge of the second magnetic layer 25 and the third magnetic layer 26. Likewise, the first gap 28 which conducts into the magnetic head a recording magnetic field generated from a magnetic recording medium is formed between the first and second magnetic layers 27 and 25. The surface 33 is the sliding surface of magnetic medium.

Recently, such a magnetic head is desired that enables a plurality of track formats having a different track width to be conformed. However, it has been impossible for the above-mentioned conventional magnetic head to conform to a plurality of track formats which allow reproduction at almost the same position of the magnetic recording medium having a different track width.

In order to conform to such demand, a lamination type magneto-resistive head 80 as shown in FIG. 7 is known. This is the same structure as that of the conventional example, and the first magneto-resistive type head 81a and the second magneto-resistive type head 81b which are different in track width from each other are consecutively laminated on a common substrate through a separate layer 83 so that the second magnetic gap 29a of the first magneto-resistive head 81a faces the first magnetic layer 27b of the second magneto-resistive type head 81b. In such a case, each magneto-resistive head has a different reproducing track width, allowing a plurality of track formats having a different track width to be conformed. That is, the magneto-resistive head 81b is used for the one track format, while the head 81a is used for another track format.

However, as mentioned above, the magneto-resistive element 23a on the first magneto-resistive type head 81a faces with the first magnetic layer 27b of the second magneto-resistive type head 81b, and the first magnetic layer 27b of the second magneto-resistive type head 81b acts as a magnetic shield with respect to the first magneto-resistive head, thereby preventing the signal magnetic field generated from the magnetic recording medium from flowing into the first magneto-resistive head. Therefore, there has been a problem in that a reproducing sensitivity is lowered at an area where ½ of the recorded wavelength on the magnetic recording medium is larger than a distance L between the first gap 28a of the first magneto-resistive head 81a and the first magnetic layer 27b of the second magneto-resistive head 81b.

SUMMARY OF THE INVENTION

In consideration of the defects of the conventional lamination type magneto-resistive head, an object of the present invention is to provide easily at low cost a lamination type magneto-resistive head having stable reproduction frequency characteristics and capable of conforming to a plurality of track formats which are different from one another in track width and/or the number of channels.

In order to achieve this objective, the lamination type magneto-resistive head of the present invention consists of one integrated structure formed by combining two magneto-resistive heads, each of which has, in a magnetic circuit, a first gap for introducing into a magnetic head a signal magnetic field generated from a magnetic recording medium, a magneto-resistive element, a second gap arranged in the vicinity of the magneto-resistive element for introducing said signal magnetic field into the magneto-resistive element, and a bias magnetic field application means for applying the a bias magnetic field to said magneto-resistive element, said magneto-resistive heads having respective first magnetic layers which face with each other.

The lamination type magneto-resistive head of the present invention allows a plurality of track formats having different track widths and/or different numbers of channels from one another to be conformed based on the above-mentioned structure, thus enabling stable frequency characteristics of the reproducing output due to the absence of magnetic interference to the magneto-resistive element area of one laminated magneto-resistive head from another magneto-resistive head.

DESCRIPTION OF PREFERRED EMBODIMENTS

Figure 1:
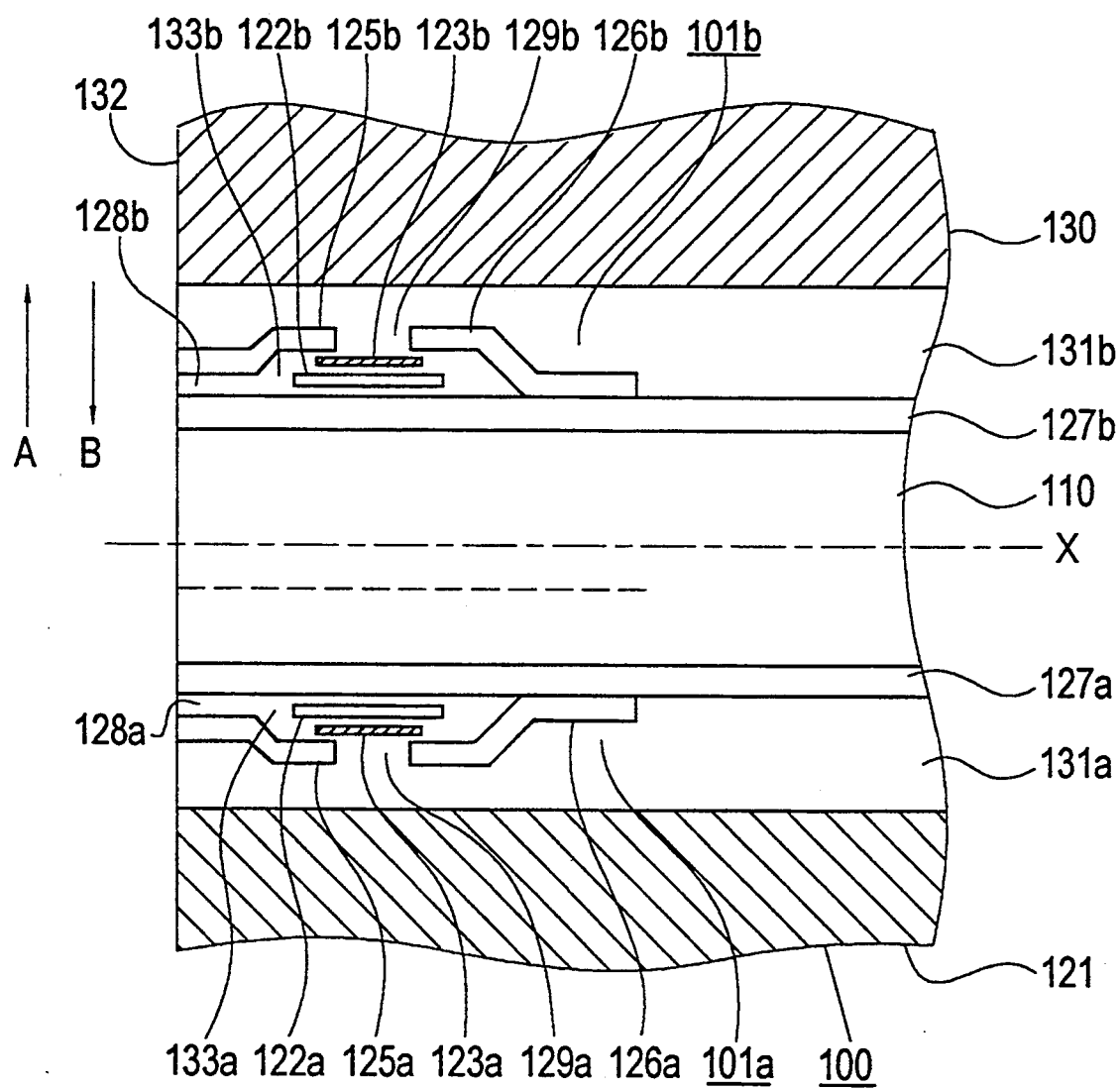
FIG. 1 is a cross-sectional view of a lamination type magneto-resistive head in accordance with a first embodiment of the present invention.
Figure 6A:
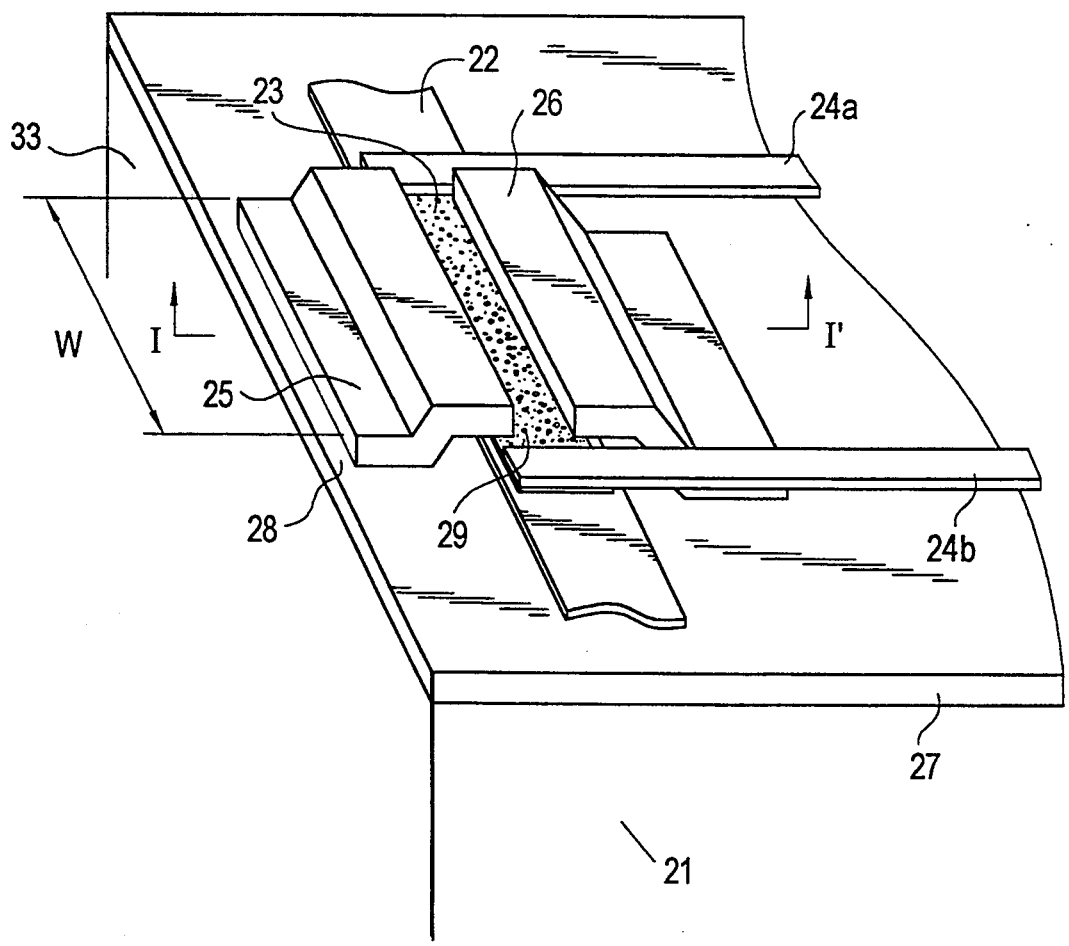
FIG. 6(a) is a general view of the main area of a conventional magneto-resistive head.
Figure 6B:
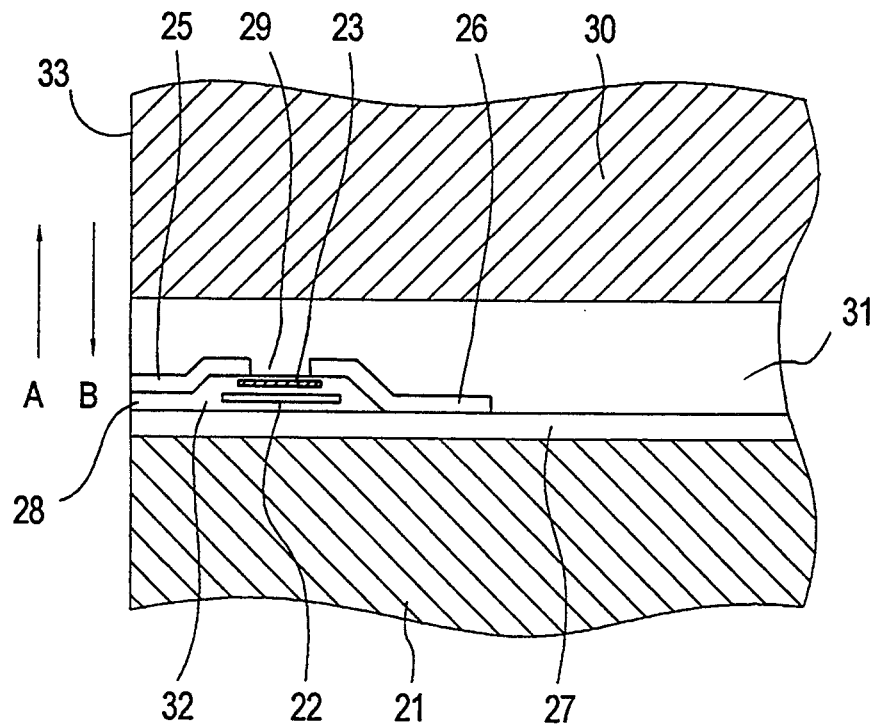
FIG. 6(b) is a cross-sectional view of I—I' of FIG. 6(a).
Figure 7:
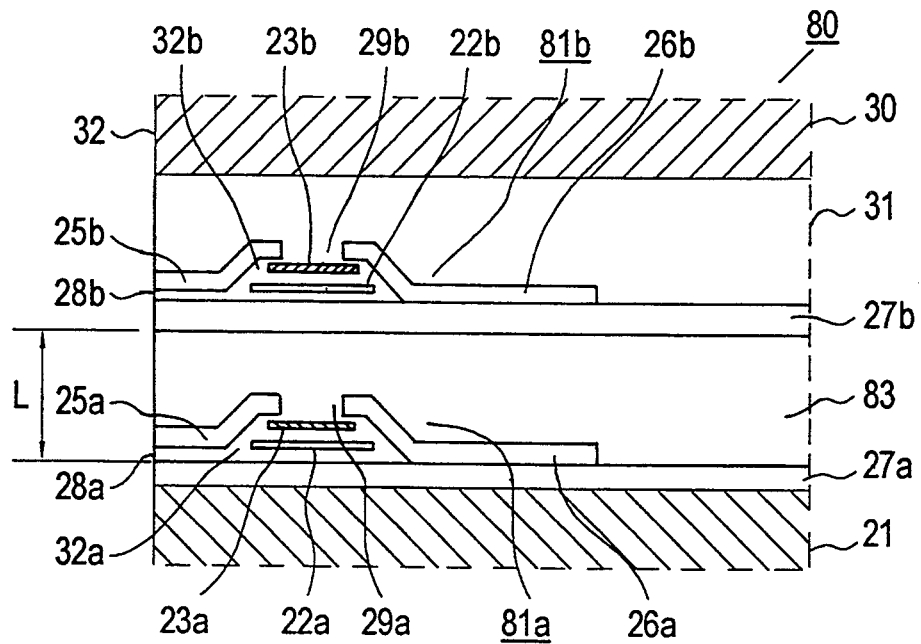
FIG. 7 is a cross-sectional view of the conventional lamination type magneto-resistive head.

FIG. 1 illustrates an embodiment of the present invention, showing a cross-sectional of a structure is a fashion similar to that of FIG. 6(b).

The lamination type magneto-resistive head 100 in the embodiment of the present invention is composed of a lamination of the first and second magneto-resistive heads 101a and 101b formed consecutively through an aluminum thin film 110. Namely, after forming a backing layer 131a like alumina, etc. on a substrate 121 composed of glass or ceramics, a second magnetic layer 125a composed of Permalloy or Sendust or amorphous magnetic materials, etc., and a third magnetic layer 126a are formed together with a second gap 129a.

Furthermore, a magneto-resistive element 123a composed of a Permalloy thin film, a bias conductor 122a composed of a conductive material such as a gold thin film or a copper thin film for applying a bias magnetic field to said magneto-resistive element 123a, and then, a first magnetic layer 127a which is composed of Permalloy, Sendust or amorphous magnetic materials, etc. are consecutively formed together with a gap 128a through an insulating layer 133a such as $SiO_2$, etc., thus becoming the first magneto-resistive head 101a. The magneto-resistive element 123a is formed in the vicinity of the second gap 129a situated between the second magnetic layer 125a and third magnetic layer 126a in such a manner that said magneto-resistive element 123a overlaps the ends of the second magnetic layer 125a and the third magnetic layer 126a.

Then, an intermediate layer 110 of alumina thin film, etc. is formed, and then a first magnetic layer 127b of the second magneto-resistive head 101b, a second magnetic layer 125b and a third magnetic layer 126b, a first gap 128b, a second magnetic gap 129b, a bias conductor 122b, magneto-resistive element 123b, and a protection layer 131b, etc. are formed through an insulating layer 133b, etc. in an approximately reverse order of the structuring the first magneto-resistive head 101a. Also, the second magneto-resistive head is formed in such a manner that its track width differs from that of the first magneto-resistive head, so that the widths of the first magnetic layer 127b, second magnetic layer 125b and third magnetic layer 126b are formed in such a way that they differ from that of the first magneto-resistive head. Finally, a cover plate 130 is bonded, followed by polishing of the magnetic medium sliding surface 132 so that the first gap 128a and 128b are exposed, thus completing the lamination type magnetic head 100. The lamination type thin film magnetic head of the embodiment of the present invention allows a plurality of track formats having a different track width to be conformed.

Namely, a magneto-resistive head is used of which track width conforms to the width of one track format, while at a different time, a magneto-resistive head of another track width is used. Furthermore, in this embodiment, the first magnetic layers 127a and 127b of two magneto-resistive heads 101a and 101b are laminated so as to face each other, magneto-resistive elements 123a and 123 do not face the other magnetic layers 127a and 127b. That is, the magneto-resistive elements 123a and 123b do not exist between the first magnetic layers 127a and 127 b. Therefore, the first magnetic layer of one magneto-resistive head does not act as a shield of another magneto-resistive head, thus providing a stable reproducible output at a low frequency range.

Figure 2:
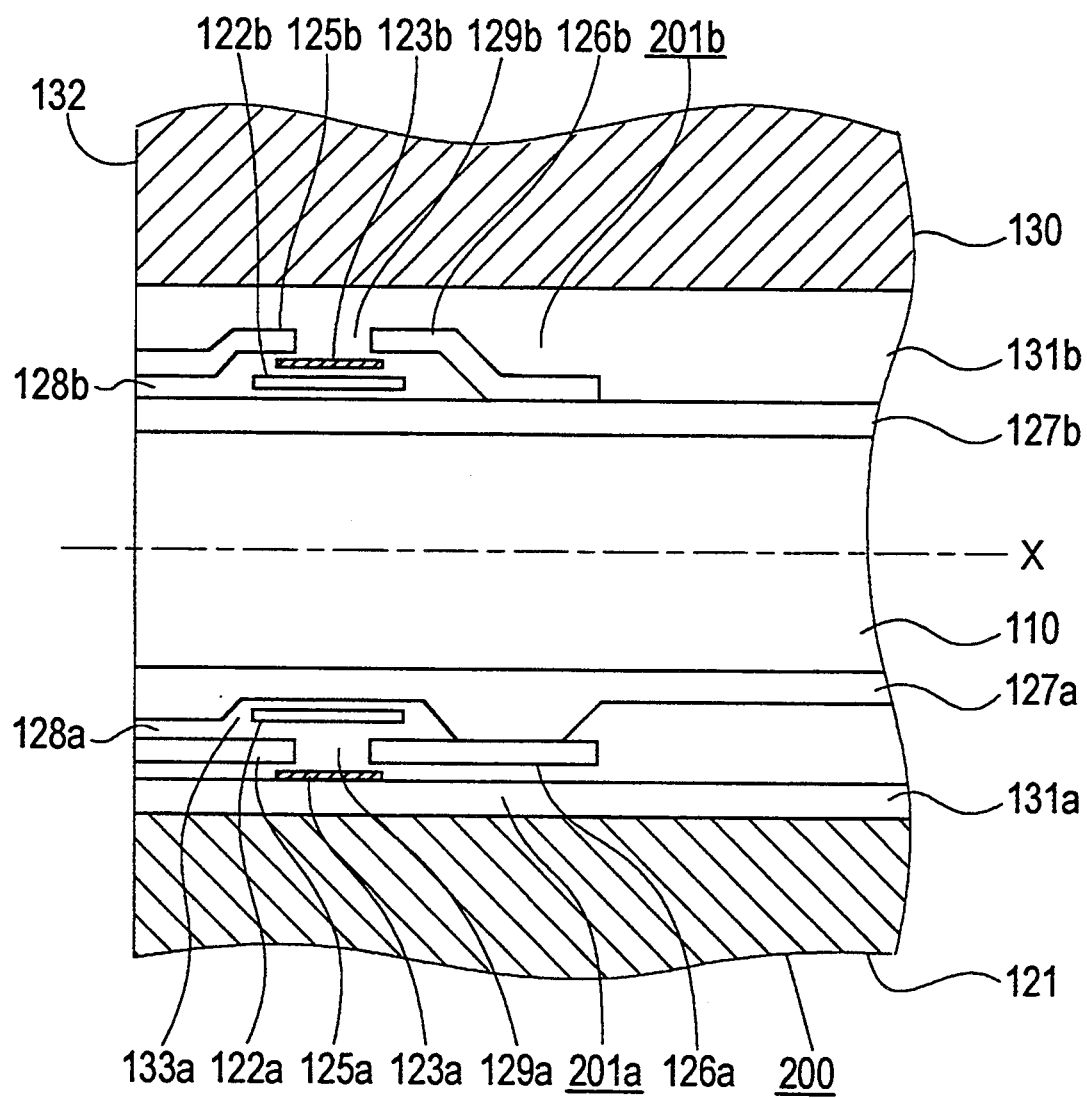
FIG. 2 is a cross-sectional view of a lamination type magneto-resistive head in accordance with a second embodiment of the present invention.

FIG. 2 illustrates the second embodiment of the present invention. The same numerical designations are applied to the same structural elements used in the first embodiment.

The lamination type magneto-resistive head 200 of the second embodiment is formed by laminating two magneto-resistive heads 201a and 201b in the same manner as in the first embodiment. In this embodiment, the formed position of magneto-resistive element 123a of magneto-resistive head 201a is different from that used in the first embodiment. That is, the magneto-resistive element 123a is situated on a flat alumina layer 131a which is formed on the substrate 121.

In general, magneto-resistive elements are subjected to noise generation and lowering in reproducible output when the flatness of its backing surface is deteriorated. Therefore, the magneto-resistive element of the present embodiment has an effect not subject to the influence of a difference in the backing surface level and allows stable reproducible characteristics to be obtained with low noise.

Figure 3:
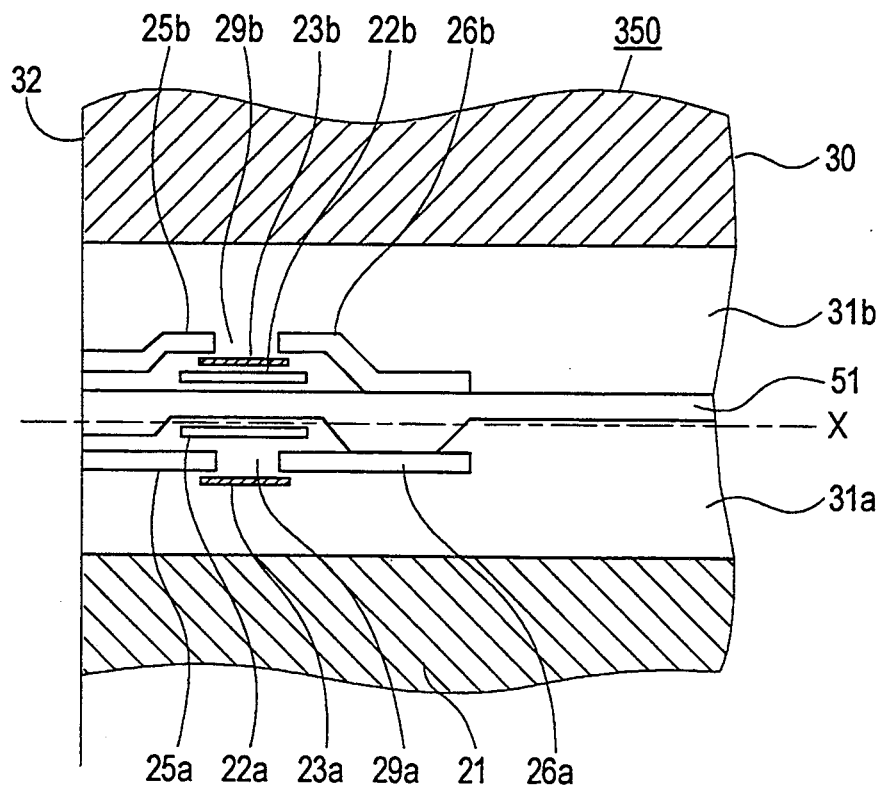
FIG. 3 is a cross-sectional view of a lamination type magneto-resistive head in accordance with a third embodiment of the present invention.

FIG. 3 illustrates the third embodiment of the present invention. The present embodiment is a lamination type magneto-resistive head 350, in which the first magnetic layer of each magneto-resistive head is commonly made, and thus a common magnetic layer 51 is formed. That is, magneto-resistive elements 23a and 23b are disposed at opposite sides with respect to the common magnetic layer 51 . In this case, it is not necessary to form an intermediate layer as in the first and the second embodiment a and a lamination type magneto-resistive head 350 has only one layer, with the first magnetic layer having commonly made.

Therefore, in this case, the production process is remarkably shortened, allowing a plurality of track formats to be easily conformed at low cost, with the effect of providing stable reproducing outputs at a low frequency range.

Figure 4:
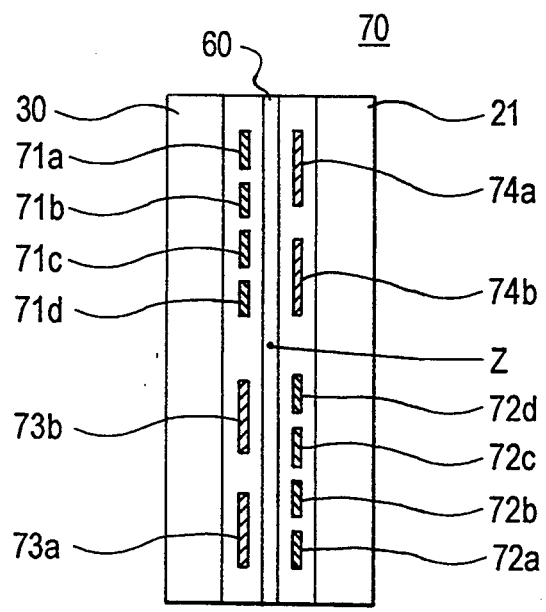
FIG. 4 is a view of a multi-channel lamination type magneto-resistive head as seen from the contact surface of magnetic recording medium in accordance with a fourth embodiment of the present invention.

FIG. 4 illustrates the fourth embodiment as seen from the sliding surface of the magnetic medium. The multi-channel lamination type magneto-resistive head 70 of the present embodiment is formed by at first arranging 4 magneto-resistive heads 71a (72a), 71b(72b), 71c(72c), and 71d(72d) having a certain track width, and also two magneto-resistive heads 73a, (74a) and 73b (74b) having a different track width in a track width direction, thus forming a multi-channel type head, followed by laminating 2 pieces so as to have a common magnetic layer 60. In this case, the positions of magneto-resistive heads having the same track width are such that heads 71a, 71b, 71c and 71d and heads 72a, 72b, 72c and 72d or heads 73a and 73b and heads 74a and 74b are arranged in a rotational symmetry with respect to an axis Z as seen from the sliding surface of magnetic medium, thus conforming to a magnetic recording medium which runs forward and backward.

Figure 5A:
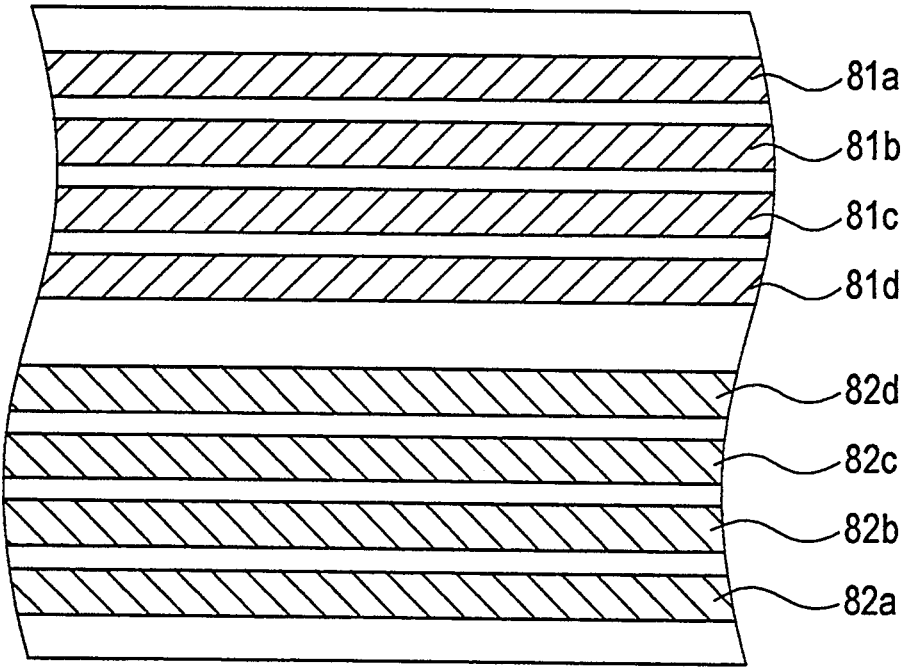
FIG. 5 (a) and (b) are views of two kinds of track formats which conform to a multi-channel lamination type magneto-resistive head in accordance with the fourth embodiment of the present invention.
Figure 5B:
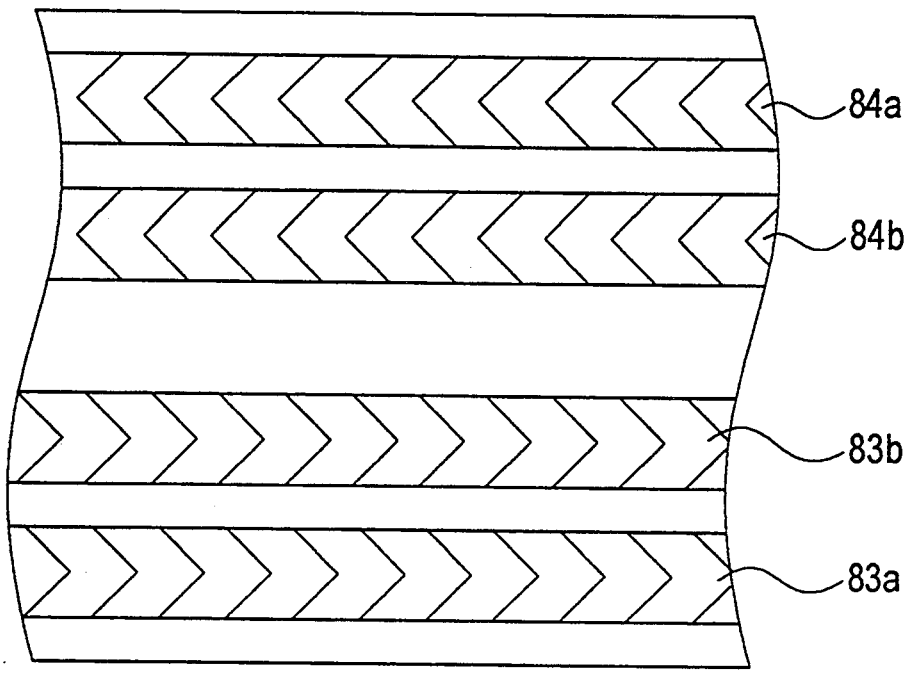

Namely, FIGS. 5(a) and (b) show track formats on 2 kinds of magnetic recording media conformable to this case. A total of 4 tracks of track formats shown in FIG. 5(a) are situated on each side of a magnetic medium, bringing about reproduction during running forward and backward. The track formats shown in FIG. 5(b) are situated with 2 tracks on each side of the magnetic recording medium, bringing about reproduction. The multi-channel lamination type magneto-resistive head 70 is the fourth embodiment, which enables 2 kinds of track formats-of reciprocally running magnetic recording medium to be conformed, providing stable reproducing outputs at a low frequency range.

When the running direction of the magnetic medium for the track format in FIG. 5(a) is F, reproduction is carried out on tracks 81a, 81b, 81c and 81d conformed by use of magnetic resist heads 71a, 71b, 71c, and 71d. When a medium running direction is R, reproduction is carried out on tracks 82a, 82b, 82c, and 82d by use of magneto-resistive heads 72a, 72b, 72c, and 72d. When the track format is as shown in FIG. 5(b) and the magnetic recording medium runs in the direction F, reproduction from tracks 83a and 84b is carried out by magneto-resistive heads 73a and 73b. Therefore, in any case, the magnetic medium first makes contact with a common magnetic layer 60 of operating magneto-resistive head, and then contact with the first gap and the second magnetic layer. As mentioned above, the positional relationship between the magnetic medium and the multi-channel lamination type magneto-resistive head is always constant, and reproduced outputs are independent of a running direction, thereby providing a stable output effect at a low frequency range because of the lack of magnetic interference from another magneto-resistive head.

As mentioned above, the lamination type magneto-resistive head of the present invention conforms to a plurality of track formats which are different from one another in track width and/or the number of channels, having such an effect that reproducing outputs become stable for a full frequency range, because the resistive element of the lamination type magneto-resistive head is not subjected to interference from another first magnetic layer.

Also, by making the first magnetic layer common, it eliminates the need for forming an intermediate layer and will further reduce the formation of a magnetic layer, thereby remarkably shortening the production process and easily providing a lamination type magneto-resistive head a low cost.

Furthermore, laminating 2 sets of plural magneto-resistive heads having the same track width arranged on one plane provides an effect which enables a plurality of multi-channel track formats to be conformed.

What is claimed is:

1. A lamination type magneto-resistive head which comprises at least two magneto-resistive heads, each of said two magneto-resistive heads comprising:

first, second, and third magnetic layers;

a first gap disposed between said first magnetic layer and said second magnetic layer;

a second gap disposed between said second magnetic layer and said third magnetic layer;

a magneto-resistive element disposed near said second gap so as to overlap an end of said second magnetic layer and an end of said third magnetic layer; and a bias magnetic field applying means for applying a bias magnetic field to said magneto-resistive element;

wherein said first magnetic layer of one of said two magneto-resistive heads substantially faces said first magnetic layer of the other of said two magneto-resistive heads and wherein said magneto-resistive element of each of said two magneto-resistive heads is absent from an area disposed between said first magnetic layer of one of said two magneto-resistive heads and said first magnetic layer of the other of said two magneto-resistive heads.

2. A lamination type magneto-resistive head which comprises at least two magneto-resistive heads, each of said two magneto-resistive heads comprising:

first, second, and third magnetic layers;

a first gap disposed between said first magnetic layer and said second magnetic layer;

a second gap dispersed between said second magnetic layer and said third magnetic layer;

a magneto-resistive element disposed near said second gap in order to overlap an end of said second magnetic layer and an end of said third magnetic layer; and a bias magnetic field applying means for applying a bias magnetic field to said magneto-resistive element, wherein a single layer commonly forms said first magnetic layer of each of said two magneto-resistive heads, and wherein said magneto-resistive element of one of said two magneto-resistive heads and said magneto-resistive element of the other of said two magneto-resistive heads are disposed at opposite sides with respect to said first magnetic layer of each of said two magneto-resistive heads.

* * * * *